(12) United States Patent
Uhlig

(10) Patent No.: US 12,339,488 B2
(45) Date of Patent: Jun. 24, 2025

(54) WIDE FIELD OF VIEW (FOV) DISPLAY SYSTEM FOR AUGMENTED REALITY (AR) AND SMART GLASSES

(71) Applicant: Hans Herrmann Uhlig, Dayton, NV (US)

(72) Inventor: Hans Herrmann Uhlig, Dayton, NV (US)

( * ) Notice: Subject to any disclaimer, the term of this patent is extended or adjusted under 35 U.S.C. 154(b) by 537 days.

(21) Appl. No.: 17/831,190

(22) Filed: Jun. 2, 2022

(65) Prior Publication Data
US 2023/0019746 A1 Jan. 19, 2023

Related U.S. Application Data

(60) Provisional application No. 63/197,658, filed on Jun. 7, 2021.

(51) Int. Cl.
| | | |
|---|---|---|
| *G02B 27/00* | (2006.01) | |
| *F21V 8/00* | (2006.01) | |
| *G02B 17/00* | (2006.01) | |
| *G02B 27/01* | (2006.01) | |

(52) U.S. Cl.
CPC ......... *G02B 6/0076* (2013.01); *G02B 17/002* (2013.01); *G02B 27/0081* (2013.01); *G02B 27/0172* (2013.01); *G02B 2027/0123* (2013.01)

(58) Field of Classification Search
None
See application file for complete search history.

(56) References Cited

U.S. PATENT DOCUMENTS

| | | | | |
|---|---|---|---|---|
| 2018/0011322 | A1* | 1/2018 | Leighton | G02B 27/10 |
| 2020/0225400 | A1* | 7/2020 | Stannard | G02B 27/14 |
| 2021/0208357 | A1* | 7/2021 | Hwang | G06F 3/011 |

\* cited by examiner

*Primary Examiner* — Phu Vu
(74) *Attorney, Agent, or Firm* — Smith Tempel Blaha LLC; Gregory Scott Smith

(57) ABSTRACT

A multilayered optical prism assembly with a sub-array of micro-mirror strips between each layer such that light passing through the assembly has an increased path length to facilitate focusing and a curved reflector increases the field of view with the light being presented through an array of pinhole micro-mirrors consisting of a combination of the sub-arrays.

13 Claims, 6 Drawing Sheets

WIDE FIELD OF VIEW (FOV) DISPLAY SYSTEM FOR AUGMENTED REALITY (AR) AND SMART GLASSES

CROSS-REFERENCE TO RELATED APPLICATIONS

This application is a non-provisional utility application filed in the United States Patent Office and claiming the benefit of the priority of the United States Provisional Application for Patent that was filed on Jun. 7, 2021 and assigned Ser. No. 63/197,658, which application is thus incorporated by reference.

BACKGROUND

Slowly but surely, advancements in technology pull the real-world and the artificial-world closer and closer together. The merging of the two technologies is referred to a augmented reality or AR. The growth of the computer industry in power, speed, and efficiency is what opens the door for such a merging experience. As we move towards this merge, the artificial or virtual-world begins to manifest itself in the real-world and, those in the real-world gravitate towards being immersed in the virtual-world. Mergers that we have only seen on the movie screen are now becoming a reality in the home.

Virtual Reality (VR) is the use of computer technology to create a simulated environment. Virtual Reality's most immediately-recognizable component is the head-mounted display (HMD). Human beings are visual creatures, and display technology is often the single biggest difference between immersive Virtual Reality systems and traditional user interfaces.

Virtual reality places the user inside a three-dimensional experience. Instead of viewing a screen in front of them, users are immersed in and interact with 3D worlds. Simulation of human senses—all five of them—transforms a computer into a vehicle transporting users into new worlds. The only limitation to a superb VR experience is computing power and content availability.

There are generally three types of VR, from non-immersive, semi-immersive, full immersive or a mixture of them, are also referred to as extended reality (XR). Three types of virtual reality experiences provide different levels of computer-generated simulation.

Non-Immersive Virtual Reality: This category is often overlooked as VR simply because it's so common. Non-immersive VR technology features a computer-generated virtual environment where the user simultaneously remains aware and controlled by their physical environment. Video games are a prime example of non-immersive VR.

Semi-Immersive Virtual Reality: This type of VR provides an experience partially based in a virtual environment. This type of VR makes sense for educational and training purposes with graphical computing and large projector systems, such as flight simulators for pilot trainees.

Fully Immersive Virtual Reality: Right now, there are no completely immersive VR technologies, but advances are so swift that they may be right around the corner. This type of VR generates the most realistic simulation experience, from sight to sound to sometimes even olfactory sensations. Car racing games are an example of immersive virtual reality that gives the user the sensation of speed and driving skills. Developed for gaming and other entertainment purposes, VR use in other sectors is increasing.

The virtual technology definition includes specific shared characteristics. Not only immersive, they are also computer-generated, believable as multidimensional experiences, and interactive.

All three types of VR, from non-immersive, semi-immersive, full immersive or a mixture of them, are also referred to as extended reality (XR). Three types of virtual reality experiences provide different levels of computer-generated simulation.

The three main VR categories are the following:

Non-Immersive Virtual Reality: This category is often overlooked as VR simply because it's so common. Non-immersive VR technology features a computer-generated virtual environment where the user simultaneously remains aware and controlled by their physical environment. Video games are a prime example of non-immersive VR.

Semi-Immersive Virtual Reality: This type of VR provides an experience partially based in a virtual environment. This type of VR makes sense for educational and training purposes with graphical computing and large projector systems, such as flight simulators for pilot trainees.

Fully Immersive Virtual Reality: Right now, there are no completely immersive VR technologies, but advances are so swift that they may be right around the corner. This type of VR generates the most realistic simulation experience, from sight to sound to sometimes even olfactory sensations. Car racing games are an example of immersive virtual reality that gives the user the sensation of speed and driving skills. Developed for gaming and other entertainment purposes, VR use in other sectors is increasing.

The virtual technology definition includes specific shared characteristics. Not only immersive, they are also computer-generated, believable as multidimensional experiences, and interactive.

Augmented reality (AR) systems may also be considered a form of VR. The main different between AR and VR is that AR layers virtual information over a live camera feed or actual visualization of one's environment with the eye giving the user the ability to view three-dimensional images integrated into his or her real world. Augmented reality is used to enhance natural environments or situations and offer perceptually enriched experiences. With the help of advanced AR technologies (e.g. adding computer vision, incorporating AR cameras into smartphone applications and object recognition) the information about the surrounding real world of the user becomes interactive and digitally manipulated. Information about the environment and its objects is overlaid on the real world. This information can be virtual. Augmented Reality is any experience which is artificial and which adds to the already existing reality.

At present, there are two primary architectures for implementing AR glasses. In a first version, image light is incident to the inside face of a curved combiner, and then redirected towards the eye box. In order to provide nominally collimated image light to the viewer for all field points, the combiner can have an extreme shape, particularly if a large field of view (FOV) is sought. In such systems, it can also be difficult to fit the optics on the temples, next to the head, while having the image light rays steer clear or miss hitting the side of the face. In a second version, such as the MICROSOFT HOLOLENS, the image light is directed into an edge of a flat waveguide or light guide, through which it propagates, until it is extracted or redirected by output coupling optics towards a viewer's eyes. Use of such waveguides can advantageously reduce the volume needed for the optics, but the diffraction gratings used for light coupling can create both chromatic and stray light image artifacts.

Also, at present, the migration to AR is plagued with limitations, including the cost of the equipment, the size, bulkiness or weight of the equipment, and the limited functionality of the equipment.

Another problem that is particularly evident in AR is that with the real-world images combined with the virtual images, a user may have trouble focusing. From an optical perspective, everyday objects are a myriad of points of light-emitting rays that, after penetrating the pupil of the eye, form an image on the retina. According to the laws of geometrical optics, when the optical system of the eye is well focused, each point of light in the object forms a point of light in the retinal image. In reality, the image is not a simple point, because the physical factors of diffraction and interference distribute the light across the retina.

There are yet opportunities for improvements into viewing devices or AR headsets. Such opportunities seek to create less expensive, more reliable, light-weight, sleek form factor headsets that provide an enhanced AR experience to the user. One such advancement that is required includes techniques to widen the field of view of AR glasses or headsets, including approaches that provide enhanced resolution or smaller blur circles.

BRIEF SUMMARY

Embodiments of the present invention are directed towards a system and technique to create a novel wide Field of View (FOV) display system for Augmented Reality (AR) and Smart Glasses applications. The main benefits and/or advantages achieved through the various embodiments of the novel wide FOV display include:

Projecting the maximum captured FOV by the lens and camera system into the desired glass lenses in front of the user;

One eye and two applications eyes are addressed;

The contents or video from a micro-LED or micro-OLED or ultra-high-definition display is projected into a prism and then to a thin glass multi-layered mirror structure to provide the user with a wide FOV and high-resolution picture. FIG. 1 illustrates an embodiment of the viewing system FIG. 4 and FIG. 5 illustrate the optical path from the display to the user's eye(s).

The thin multi-layer glass structure is composed of micro-mirrors strips at each glass layer to create the vertical projection. The strips are placed in a manner to project the desired vertical view. The number of vertical layers is dictated by the desired vertical FOV dimension.

The bottom of the glass multi-layered structure is a curved reflective mirror to create the horizontal picture dimension desired. Thus, it should be appreciated what increasing the width and the length of the assembly of vertical layers can increase the FOV.

The configured patterned design of the mirror strips on each layer of the structure is unique in the display system depending on the optical desired outcome.

The micro-mirror strips pattern allows up to 95% of transparency at all times. In some embodiments the micro-mirror strips pattern allows a transparency range of 85% to above 95%. In some embodiments the micro-mirror strips pattern allows a transparency range of 75% to above 95%. The transparency (ability to see through the multi-layer glass structure into the real-world) is controlled by the design of the micro-mirror strips at each layer of the glass structure. This will allow the user to see the contents projected by the viewing system described here and see thru to the real-world simultaneously—thus creating an AR environment.

The AR or Smart glasses can be made out of optical glass or optical plastic material.

The display system and optical path is shown in FIG. 1. The system can project the desired Field of View onto the desired glass structure by using a unique prism design and a multilayered optical glass or plastic structure with arrays of micro mirrors. In addition, the display system uses a determined reflective layer at the bottom to achieve the desired Field of View in the display system which, in combination with the multi-layer structure with progressive micro mirrors on each reflective layer projecting the image across the glass structure. The FOV is achieved by the combination of the multi-layered optical structure and the width and angle of the reflective bottom surface.

These and other features, benefits and advantages will be more fully understood by the detailed description and the drawings provided herein below.

DETAILED DESCRIPTION OF VARIOUS EMBODIMENTS ON

The present invention, as well as features and aspects thereof, is directed towards providing a wide Field of View (FOV) display system for Augmented Reality (AR) headsets and Smart Glasses applications.

Various embodiments of the inventive viewing system presented herein, as well as equivalents thereof, are configured to project the maximum captured FOV by the lens and camera system into desired glass lenses that are positioned in front of the user. The various embodiments can be utilized for one eye or two eye applications.

In general, the contents or video from a micro-LED or micro-OLED or ultra-high-definition display is projected into a prism and then to a thin, glass, multi-layered mirror structure to provide the user with a wide FOV and a high-resolution picture.

More specifically, an image is presented from a source in the form of radiated light energy, such as that which is available from a micro-LED, micro-OLED, etc. In typical AR headset environments, it is desired to make the headset as light and comfortable as possible. As such, the source has a small viewing area, typically less than 0.5 inches on the diagonal or much less. Such a source is utilized to prevent the AR headset from being too large or bulky. However, the viewing area of the source is too small and thus, one of the features of the various embodiments of the wide FOV display system is to scale the viewing area of the source to create a wider field of view.

The field of view is expanded by passing the light energy from the source through a series of lenses and prisms to expand the image. Once expanded, the image is directed through an array of pinhole mirrors creating the field of view for the augmented reality image to be viewed simultaneously with the actual reality.

Figure 1:
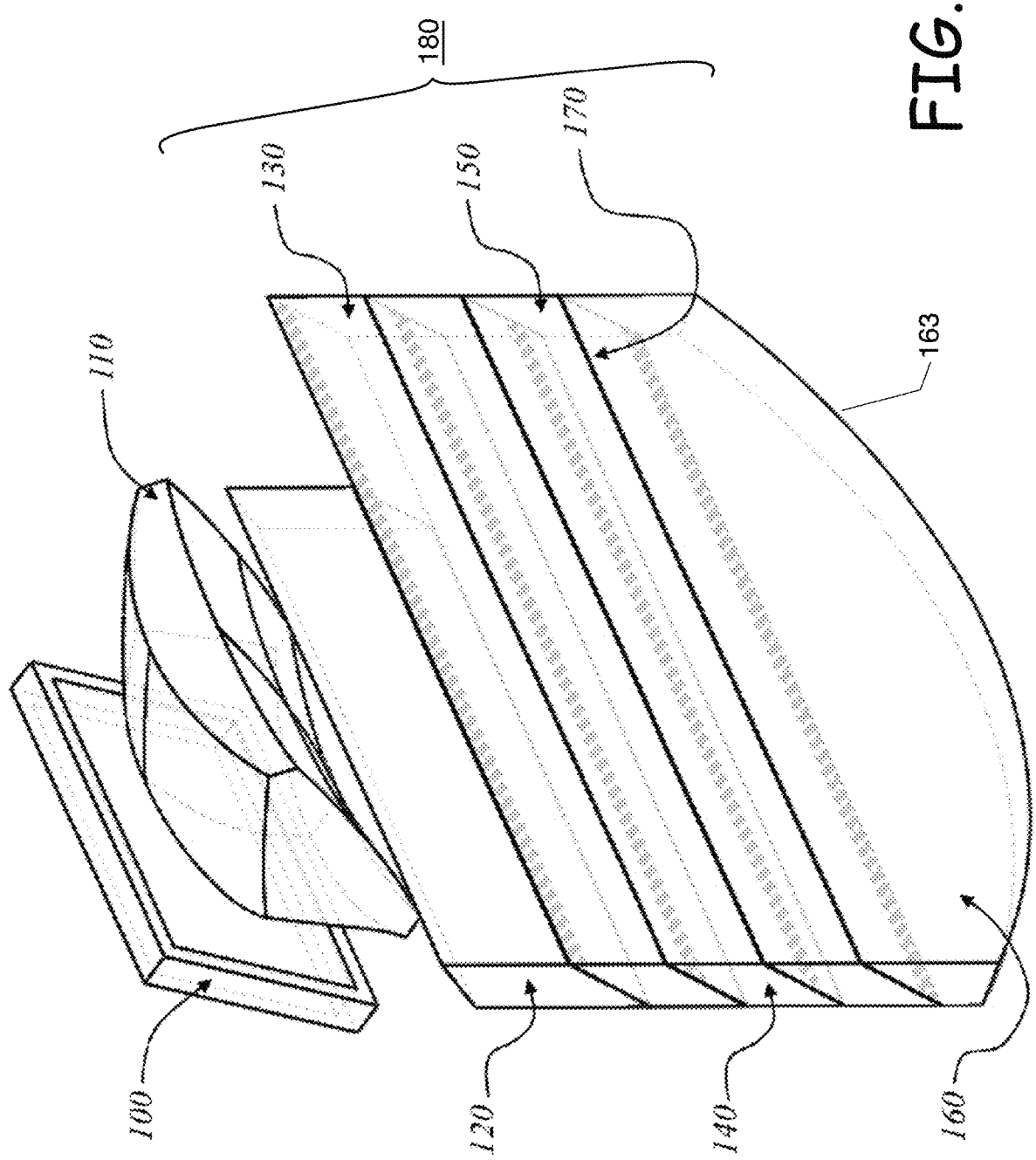
FIG. 1 is an isometric view of the optic assembly in accordance with an aspect of the present invention.

FIG. 1 is an isometric view of an embodiment of the optic assembly in accordance with an aspect of the present invention. The illustrated viewing system is illustrated as including the image source 100, which could be a micro-LED, micro-OLED, miniature TV or other similar source as non-limiting examples. The light from the source is then passed through a lens 110. In some embodiments, a Collamer lens may be utilized.

The optic assembly includes an optical prism. The optical prism is designed to project the source video contents to the multi-layered glass structure with micro-mirror strips at each layer. The light energy from the source 100 enters the lens 110. As light energy exits the lens 110 it is directed through a prism 120. The prism 120 is an angle prism with one surface including a sub-array of pinhole mirrors. The light passes through prims 120 and into prism 130, followed by prism 140, prism 150 and finally to prism 160. Prism 160 includes a curved mirror surface 163. The light energy that hits the surface 163 is directed back through the prisms and is visible to the user through the array of pinhole mirrors consisting of each of the sub-arrays of pinhole mirrors.

Figure 2:
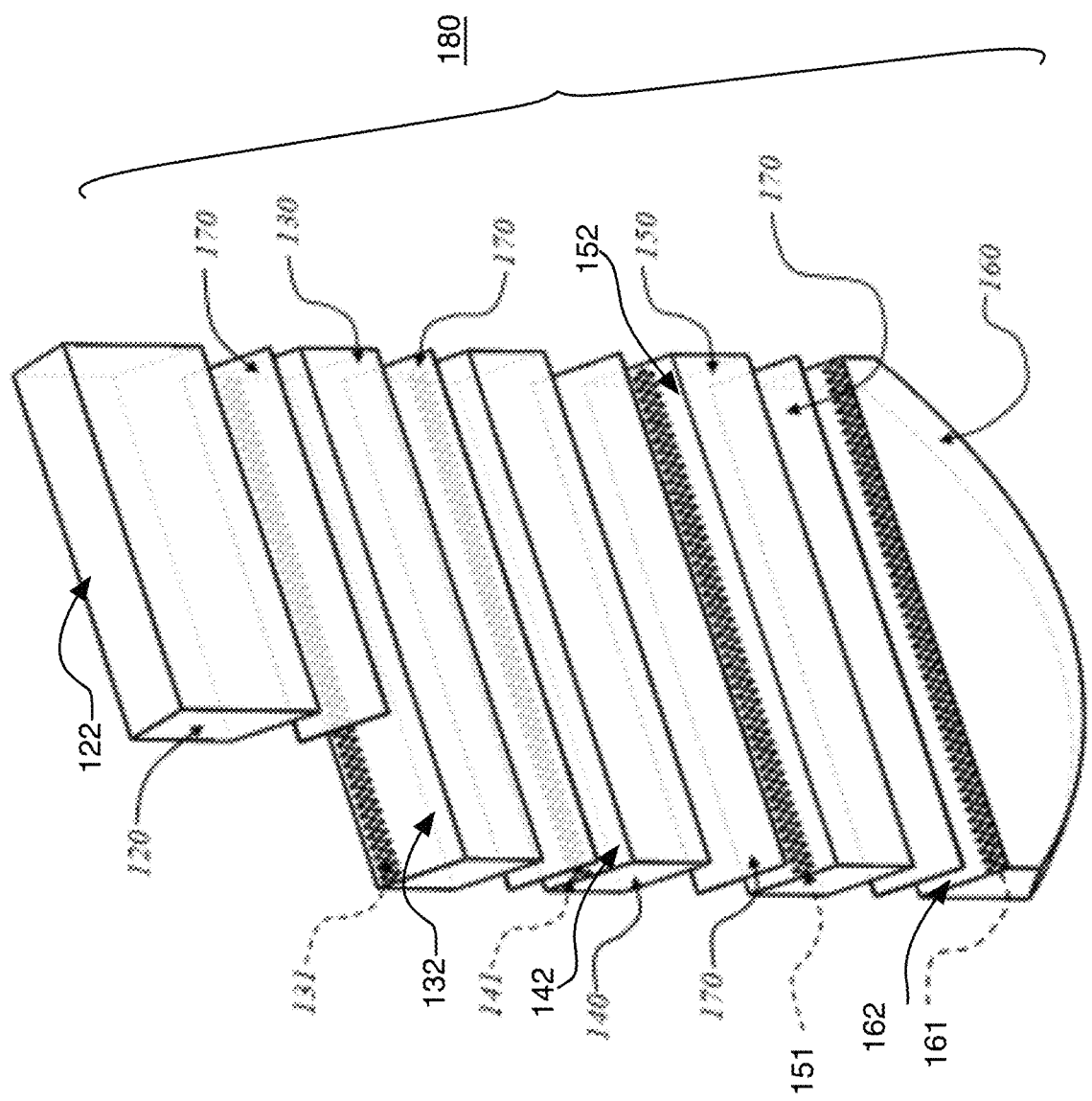
FIG. 2 is an isometric exploded view of the view/output optic assembly in accordance with an aspect of the present invention.

FIG. 2 is an isometric exploded view of the view/output optic assembly in accordance with an aspect of the present invention. The illustrated embodiment of the assembly 180 is a five-layer optical assembly design as a non-limiting example. Those skilled in the art will appreciate that fewer or more vertical optical layers may be incorporated into various embodiments depending on the desired projection dimensions (FOV), resolution, size of the optical layers and see thru specifications. However, throughout the various views presented herein, the five-layer embodiment is utilized to illustrate the concept.

The optic assembly 180 includes a multi-layered optical glass or optical plastic including a prism 120 as the first optical glass layer. The second optical glass layer 130 is adjacent to the prism 120. A third optical glass layer 140 is adjacent to the second optical glass layer 130. A fourth optical glass layer 150 is adjacent to the third optical glass layer 140. A fifth optical glass layer 160 is adjacent to the fourth optical glass layer 150. One or more of the layers is illustrated as including a micro-mirror strip illustrated as a pattern on the upper surface of the second optical glass layer 130, the third optical glass layer 140, the fourth optical glass layer 150 and the fifth optical glass layer 160. The second optical glass layer 130 is illustrated as including the micro-mirror strip 131 on the top surface 132 of the optical glass 130. The third optical glass layer 140 includes a micro-mirror strip 141 on the top surface 142 of the optical glass layer 140. The fourth optical glass layer 150 includes a micro-mirror strip 151 on the top surface 152 of the optical glass layer 150. The fifth optical glass layer 160 includes a micro-mirror strip 161 on the top surface 162 of the optical glass layer 160.

In general, the micro-mirror strips are reflective surfaces with pinholes that allow some light to pass while reflecting or filtering the rest. As those skilled in the art will appreciated, having an array of pinholes with a particular spacing between them will allow sufficient light to pass through such that the image and be observed with the eye at a resolution of the density of the pinholes.

The pinhole micro-mirror strips are placed on the surfaces of the optical glass. One technique to accomplish this is to apply a mask to the surface of the optical glass, wherein the mask defines the size, location, and pattern of the pinhole mirrors (or small reflective surfaces with gaps between each. The surface with the mask applied is then processed by attaching silver atoms onto the glass surface at all locations that are not masked. Thus, upon completion of the process, the mask can be removed and the surface of the optical glass is left with a reflective silver surface of an array of pinhole mirrors with non-covered gaps therebetween.

Figure 3:
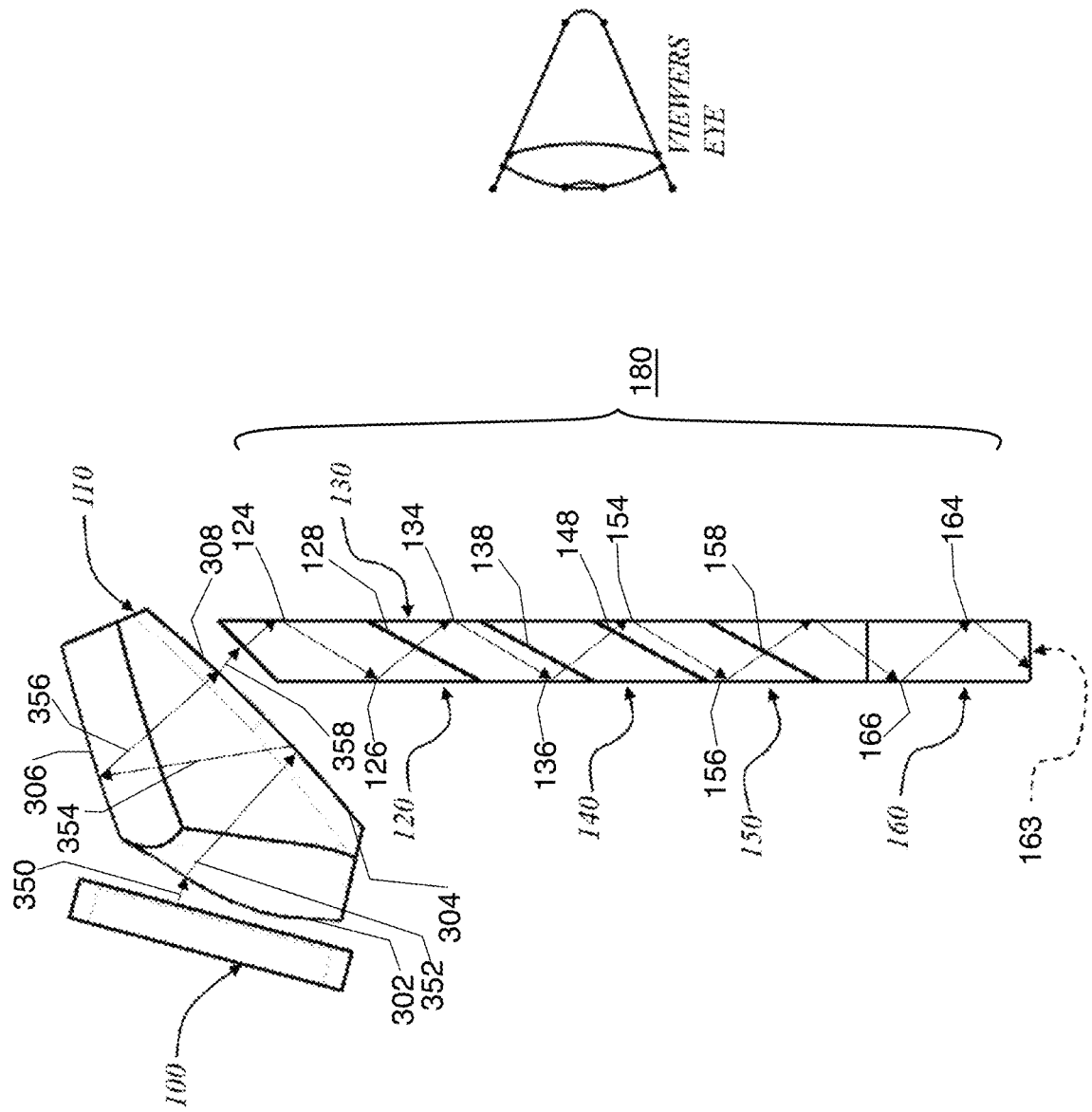
FIG. 3 is a side view of the optic assembly showing the picture transmission path from the display to mirrored/reflective curved optic bottom.

FIG. 3 is a side view of the optic assembly showing the transmission path of light energy from the display to the mirrored/reflective curved optic bottom. As the light 350 is emitted from the source 100, it is directed towards the Collamer lens 110 and lands on surface 302 of the Collamer lens 110. The light energy is the refracted and directed 352 towards a mirrored surface 304 within the Collamer lens 110. The light energy is then reflected from the mirrored surface 304 and directed 354 to mirrored surface 306. The light is again reflected from mirrored surface 304 and directed 356 out of the Collamer lens 110 towards the optical glass array 180 through the surface 308 of the Collamer lens 110.

The light energy then propagates 358 to the upper surface 122 (FIG. 2) of the optical glass prism element 120. The light energy then bounces off the mirrored surface 124, then mirrored surface 126, and then exiting optical glass prism element 120 through surface 128. The light energy then propagates to the upper surface 132 (FIG. 2) of the optical glass prism element 130. The light energy then bounces off the mirrored surface 134, then mirrored surface 136, and then exiting optical glass prism element 130 through surface 138. The light energy then propagates to the upper surface 142 (FIG. 2) of the optical glass prism element 140. The light energy is then illustrated as exiting optical glass prism element 140 through surface 148. The light energy then propagates to the upper surface 152 (FIG. 2) of the optical glass prism element 150. The light energy then bounces off the mirrored surface 154, then mirrored surface 156, and then exiting optical glass prism element 150 through surface 158. The light energy then propagates to the upper surface 162 (FIG. 2) of the optical glass prism element 160. The light energy then bounces off the mirrored surface 166, then mirrored surface 164, and then lands on the bottom mirrored and reflective surface 163 of the optical glass prism 160.

Figure 4:
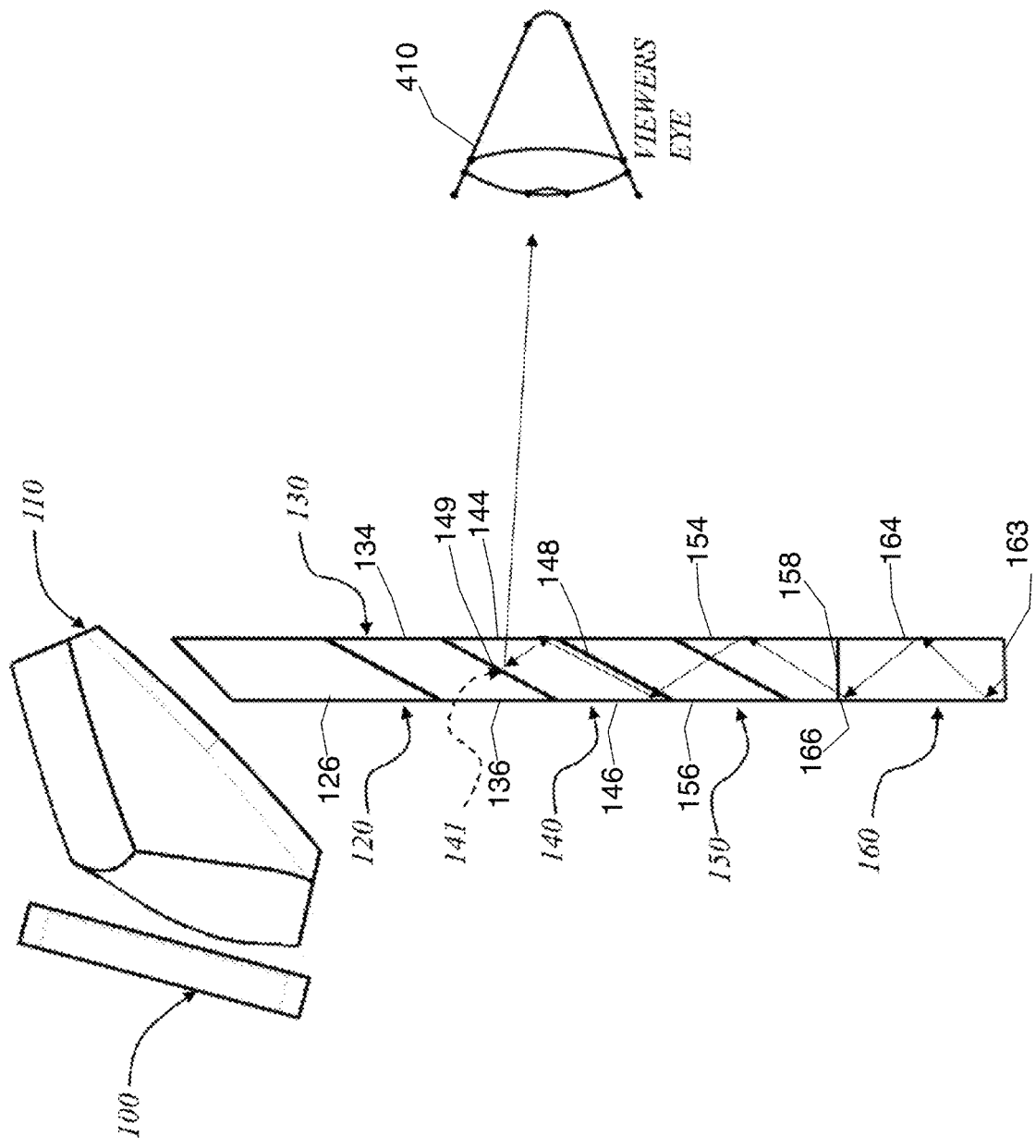
FIG. 4 is a side view of the optic assembly showing the picture transmission path from the mirrored/reflective curved optic bottom through pin hole mirror to the viewer's eye.
Figure 5:
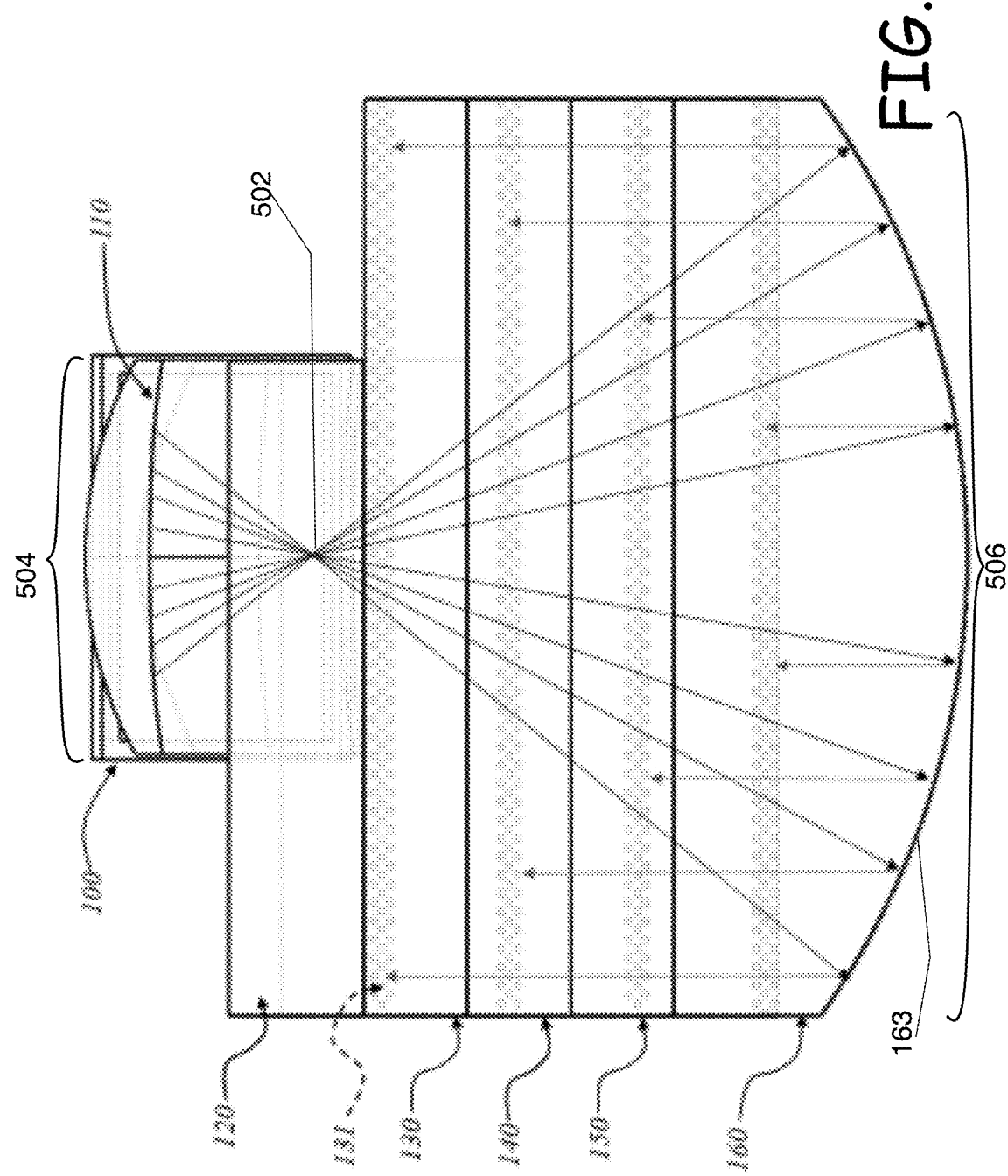
FIG. 5 is a front/side view of the optic assembly showing the picture transmission path from the first optic through to the viewer's eye.

FIG. 4 is a side view of the optic assembly showing the picture transmission path from the mirrored/reflective curved optic bottom through pin hole mirror to the viewer's eye. As best illustrated in FIG. 1 and FIG. 5, the bottom surface 163 of the optical glass prism element 160 is curved. FIG. 5 is a front/side view of the optic assembly showing the light energy transmission path from the first optic through to the viewer's eye. From the angle illustrated in FIG. 5, the light path appears to propagate on a straight path through the optical glass layers. However, the lines illustrated in FIG. 5 are actually showing the plain of the light path as the light path does bounce from surface to surface within the individual optical glass layers as illustrated in FIG. 3 and FIG. 4.

Returning to FIG. 4, the light path is illustrated as propagating from the mirrored curved surface 163 of optical glass layer 160, bouncing off the mirrored surface 166, then mirrored surface 164, then mirrored surface 166 again, and then exiting the optical glass layer 160 through surface 162

(FIG. 2). The illustrated light path is then illustrated as entering the optical glass layer 150 through the bottom surface 158 and bouncing off the mirrored surface 154 and then exiting the optical glass layer 150 through surface 152 (FIG. 2). The illustrated light path is then shown as entering the optical glass layer 140 through surface 142 (FIG. 2), bouncing off surface 146 and then surface 144. Finally, the illustrated light path strikes a pinhole mirror 149 which cause the light path to reflect through surface 144 towards a viewer's eye 410.

The pinhole micro-mirror strips, as best seen in FIG. 2, are staggered with relationship to each other on the upper surfaces of the optical glass layers. The micro-strip pattern matrix is designed to reproduce a top to bottom scan-line array splitting the image into 4 vertical sections avoiding occlusion of the active layer by the previous. The designed layout matrix is optimized to achieve the viewing pass-thru capability and provide the desired projected picture projected into the eye(s). This technique eliminates ghosting caused by image doubling.

In FIG. 2 the pinhole micro-mirror strip 131 is proximate to the back edge of the surface 132. The pinhole micro-mirror strip 141 is shown as being shifted slightly further towards the front edge of the surface 142 of optical glass layer 140. Likewise, the pinhole micro-mirror strip 151 is shifted further than the pinhole micro-mirror strip 141 and the pinhole micro-mirror strip 161 is illustrated as being proximate to the front edge of optical glass layer 160.

FIG. 5 is a front/side view of the optic assembly showing the picture transmission path from the first optic through to the viewer's eye. Further, the various pinhole micro-mirror strips can be seen as creating an array across the multiple optic glass layers. The angles of the top and bottom surfaces of the optical glass layers or prisms operate to combine the multiple pinhole micro-mirror strips into the array. The angles and positioning of the pinhole micro-mirror strips are design such that from the viewer's perspective, the gaps between the pinhole micro-mirror strips are sufficient to allow real-world image light through the optical assembly, but close enough to each other such that the image reflected from the pinhole micro-mirror strips appears continuous to the viewer.

One of the problems that the various embodiments of the wide FOV optic system addresses is creating a compact and small sized system to prevent the application product, such as an AR headset, from being large, bulky and heavy. Those skilled in the art will understand that it is difficult for the human eye to focus on anything closer than 6 inches from the eye. As such, the challenge comes down to how to create an optical system that maintains a distance of 6 inches or more from the eye without the headset being cumbersome or bulky. Advantageously, the structure of the optical system 180 creates a light path from the source 100, to the reflecting pinhole mirror and then to the viewers eye that is of sufficient length to help the user focus. In some embodiments, the length of the light path is at least 4 inches. In some embodiment the length of the light path is at least 5 inches. In some embodiments, the length of the light path is in a range of 4 to 6 inches or 5 to 6 inches. Thus, in some embodiments of the wide FOV optic system approximates or may even exceed 6 inches. This is accomplished by the extended path obtained from the light path bouncing between the surfaces as the light traverses through the various optic glass layers, reflecting from the surface 163 in the last optical glass layer 160, traversing back through the optic glass layers until finally striking a pinhole micro-mirror and then traversing on the path to the viewer's eye.

Returning again to FIG. 5, it can be seen that the image from source 100 is inverted as it passes through the Collamer lens 110 (see point 502). The light path through the Collamer lens 110 is directed through the optical glass layers at various angles, thus expanding the field of view of the image. It is clear that the surface 504 from which the light energy exits the Collamer lens 110 is much smaller than the size 506 of the bottom surface 163 in the last optical glass layer 160.

In addition, in FIG. 5 it can be observed that the curvature of the bottom surface 163 of the optic glass layer 160 is selected such that the reflected light energy is straightened out with relationship to the optic layers. As such, the light energy propagates straight up through the layers, at least on the illustrated plane, and eventually landing on one of the pinhole micro-mirrors on the surface of one of the optic layers. The light energy striking a pinhole micro-mirror then is directed towards the viewer's eye.

The pinhole micro-mirror array consists of an array of silver atom deposited mirrors at the size of approximately 0.5 to 0.8 millimeters but it should be understood that some embodiments may use pinhole micro-mirrors that are larger or smaller. Further, the distance between the pinhole micro-mirrors may vary from embodiment to embodiment. The pinhole micro-mirrors do not touch each other but rather gaps exist between each pinhole micro-mirror and surrounding each pinhole micro-mirror. Thus, when the viewer is looking at the optic glass layer assembly 180, the light from the source 100 is reflecting from the pinhole mirrors toward the viewer's eye but, the viewer can also see through the optic glass layer assembly 180 through the gaps between the pinhole micro mirrors.

Each of the optic glass layers may be joined together, such as with the use of optical glue as a non-limiting example.

The pattern of the pinhole micro-mirror strips is configured to allow up to 95% of transparency at all times. The transparency (defined as the ability to see through of the multi-layer glass structure) is controlled by the design of the micro-mirror strips at each layer of the glass structure. Percent efficiency of opacity of the lens is controlled by brightness of the image emitted from the source 100. If the source image is set at 100% brightness and the real world includes a black background, the background is overpowered by the light so that the viewer cannot see the background. Controlling the brightness of the source 100, such as the OLED image, helps to adjust the transparency and opacity.

The transparency enables the viewer to see the contents projected by the viewing system described and also to see through the lenses simultaneously to view the real-world. The light that is reflected from the micro-mirrors is directed towards the viewer and melds together to create one cohesive screen that includes the virtual reality imagery from the source 100 and the real-world imagery as the user can see through the optic glass layer assembly. However, depending on the intensity of the light being emitted from the source 100 and reflecting towards the viewer's eyes, the ability to see through the lens can be retarded. The brighter the light energy emitted from the source 100, the less viewable the real-world imagery is the viewer. As such, a balance must be achieved to properly visualize the augmented reality from the source 100 with the real-world reality.

The angles for the optical glass layers or prisms are calculated based on the orientation of the glasses in front of the user. Typically, the glasses are placed perpendicular to the eye(s) but this invention covers other orientation angles. The glasses can be at any angle with respect to the eye(s).

The prism design must be adjusted to support the desired projection angle into the glasses.

Figure 6:
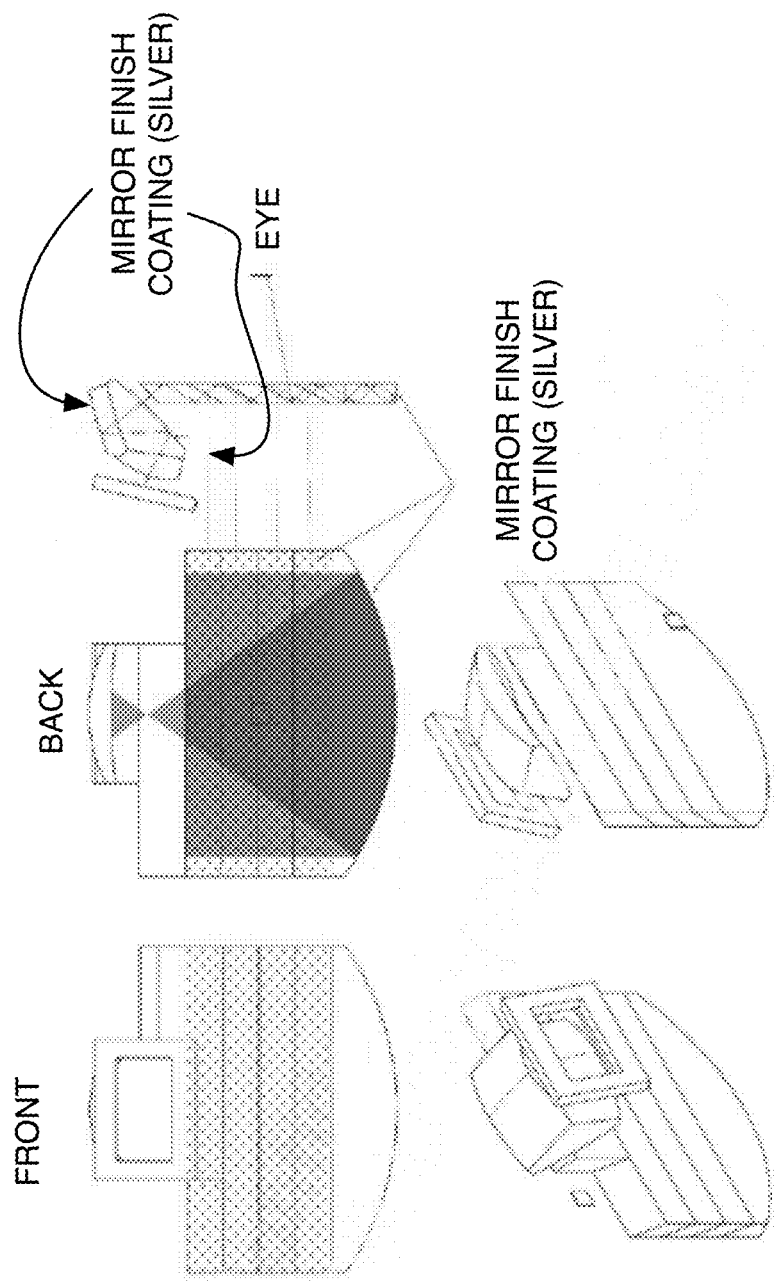
FIG. 6 is another view illustrating the optical path for the system.

FIG. 6 is another view illustrating the optical path for the system.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. An optical assembly used to provide a wide field of view in an augmented reality headset, the optical assembly comprising:
    a plurality of optical glass prism layers, wherein each of the plurality of optical glass prism layers are positioned adjacent to each other;
    the adjoining surfaces between each of the plurality of optical glass prism layers including a sub-array of pinhole micro-mirrors;
    a first optical glass prism layer of the plurality of optical glass prism layers being adjacent to a light energy source and being configured to receive the light energy from the light energy source and pass the light energy source to a next and adjacent optical glass prism with zero or more reflections off of the walls of the first optical glass prism layer;
    the next and adjacent optical glass prism layer being configured to receive light energy from a previous optical glass prism layer and pass the light energy to the succeeding optical glass prism layer with zero or more reflections off of the walls of the next and adjacent optical glass prism layer until the light energy reaches a curved bottom mirrored surface of a last optical glass prism layer;
    the curved bottom mirrored surface of the last optical glass prism layer configured to reflect the light energy straight up and back through the plurality of optical glass prism layers until the light energy hits a pinhole micro mirror which causes the light energy to be directed towards the eye of a viewer.

2. The optical assembly of claim 1, wherein the pinhole micro-mirrors are formed by placing a mask on the surface of each of the plurality of optical glass prism layers and depositing silver atoms on the surface to create the sub-array of pinhole micro-mirrors.

3. The optical assembly of claim 2, wherein the microstrip sub-arrays are positioned to reproduce a top to bottom scan-line array splitting the image into multiple vertical sections avoiding occlusion of the active layer by the previous.

4. The optical assembly of claim 3, wherein the pinhole micro-mirrors range from 0.5 to 0.8 millimeters in diameter.

5. The optical assembly of claim 3, wherein the width of each of the plurality of optical glass prism layers is larger than the width of the source.

6. The optical assembly of claim 5, wherein the light source includes a Collamer lens.

7. The optical assembly of claim 6, wherein the light source includes a micro-OLED display.

8. The optical assembly of claim 3, wherein the pinhole micro-mirror array creates a 95% transparency level.

9. The optical assembly of claim 3, wherein the pinhole micro-mirror array creates a transparency level range of 85% to over 95%.

10. The optical assembly of claim 3, wherein the length of the light path from the light source to the eye of the viewer is at last 4 inches.

11. The optical assembly of claim 3, wherein the length of the light path from the light source to the eye of the viewer is greater than 4 inches.

12. The optical assembly of claim 3, wherein the length of the light path from the light source to the eye of the viewer is greater than 5 inches.

13. The optical assembly of claim 3, wherein the length of the light path from the light source to the eye of the viewer ranges from 4 inches to approximately 6 inches.

* * * * *